US012753894B2

(12) United States Patent
Chiang et al.

(10) Patent No.: US 12,753,894 B2
(45) Date of Patent: Oct. 6, 2026

(54) VEHICLE PROJECTION LENS

(71) Applicant: Young Optics Inc., Hsinchu Science Park (TW)

(72) Inventors: Chen-An Chiang, Hsinchu Science Park (TW); Kuo-Chuan Wang, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 0 days.

(21) Appl. No.: 19/008,152

(22) Filed: Jan. 2, 2025

(65) Prior Publication Data

US 2026/0043530 A1 Feb. 12, 2026

(30) Foreign Application Priority Data

Aug. 9, 2024 (TW) ................................ 113130071

(51) Int. Cl.
*F21S 41/25* (2018.01)
*F21S 41/40* (2018.01)

(52) U.S. Cl.
CPC ............... *F21S 41/25* (2018.01); *F21S 41/40* (2018.01)

(58) Field of Classification Search
CPC .................................. F21S 41/25; F21S 41/40
See application file for complete search history.

(56) References Cited

U.S. PATENT DOCUMENTS

| | | | | | |
|---|---|---|---|---|---|
| 3,998,529 | A * | 12/1976 | Fleischman | G02B 13/24 | 359/774 |
| 5,936,783 | A * | 8/1999 | Nakai | G02B 9/34 | 359/773 |
| 9,690,082 | B2 * | 6/2017 | Lee | G02B 13/16 | |
| 10,877,252 | B2 * | 12/2020 | Chen | G02B 13/006 | |
| 2010/0142062 | A1 * | 6/2010 | Asami | G02B 13/04 | 359/793 |
| 2012/0099210 | A1 * | 4/2012 | Huang | G02B 13/18 | 359/716 |
| 2018/0163940 | A1 * | 6/2018 | Nozue | F21S 41/40 | |
| 2019/0204569 | A1 * | 7/2019 | Jiang | G02B 13/06 | |
| 2019/0242543 | A1 * | 8/2019 | Guan | F21S 45/48 | |
| 2020/0081229 | A1 * | 3/2020 | Lai | G02B 9/60 | |
| 2020/0192062 | A1 * | 6/2020 | Lin | G02B 13/146 | |
| 2020/0209555 | A1 * | 7/2020 | Shimoeda | G02B 13/0045 | |
| 2022/0229270 | A1 * | 7/2022 | Jiang | G02B 9/34 | |

(Continued)

FOREIGN PATENT DOCUMENTS

CN 112882211 B 12/2021

*Primary Examiner* — Thien M Le
*Assistant Examiner* — Asifa Habib
(74) *Attorney, Agent, or Firm* — MUNCY, GEISSLER, OLDS & LOWE, P.C.

(57) ABSTRACT

A vehicle projection lens includes an aspheric first lens with a positive refractive power, a cemented lens comprised of a spherical second lens and a spherical third lens, and a spherical fourth lens with a positive refractive power arranged in order from a magnified side to a minified side. The vehicle projection lens satisfies the following conditions: (1) an aperture stop is disposed between the third lens and the fourth lens; (2) an F-number of the vehicle projection lens is less than or equal to 0.86; (3) a full field of view of the vehicle projection lens ranges from 30 to 70 degrees; and (4) an effective focal length of the vehicle projection lens ranges from 13 mm to 28 mm.

19 Claims, 9 Drawing Sheets

(56) References Cited

U.S. PATENT DOCUMENTS

| | | | | |
|---|---|---|---|---|
| 2022/0275918 | A1* | 9/2022 | Chiang | F21S 41/265 |
| 2022/0397745 | A1* | 12/2022 | Chiang | F21S 41/265 |
| 2023/0280009 | A1* | 9/2023 | Wang | F21S 41/148<br>362/521 |
| 2025/0334778 | A1* | 10/2025 | Sato | G02B 5/005 |
| 2025/0362485 | A1* | 11/2025 | Shim | G02B 13/18 |
| 2025/0370222 | A1* | 12/2025 | Yang | G02B 13/0045 |

* cited by examiner

VEHICLE PROJECTION LENS

CROSS-REFERENCE TO RELATED APPLICATION

This application claims the priority benefit of Taiwan application serial no. 113130071, filed Aug. 9, 2024. The entirety of the above-mentioned patent application is hereby incorporated by reference herein and made a part of this specification.

BACKGROUND

Field of the Invention

The invention relates to a projection lens, particularly to a vehicle projection lens designed for application in vehicle headlights.

Description of the Related Art

Vehicle headlights can help the driver identify the environmental conditions ahead, notify nearby individuals of the driver's current location, and provide a considerable level of warning. Currently, smart headlamps capable of projecting high-resolution images to assist drivers, while avoiding glare for other road users, are available on the market. However, traditional projection lenses used in conventional projection devices fail to meet light pattern requirements for vehicle headlamps specified in government regulations. Furthermore, the balance between optical quality and manufacturing costs must be also considered. Therefore, it is desirable to develop a vehicle projection lens that combines wide viewing angles and larger effective apertures with low fabrication costs, high imaging quality, and compliance with government regulations specifying light pattern requirements.

BRIEF SUMMARY OF THE INVENTION

In order to achieve one or a portion of or all of the objects or other objects, one embodiment of the invention provides a vehicle projection lens including an aspheric first lens with a positive refractive power, a cemented lens comprised of a spherical second lens and a spherical third lens, and a spherical fourth lens with a positive refractive power arranged in order from a magnified side to a minified side of the vehicle projection lens. The second lens is a concave lens and has a negative refractive power, and the third lens has a positive refractive power. The vehicle projection lens satisfies the following conditions: (1) an aperture stop is disposed between the third lens and the fourth lens; (2) an F-number of the vehicle projection lens is less than or equal to 0.86; (3) a full field of view of the vehicle projection lens ranges from 30 to 70 degrees; and (4) an effective focal length of the vehicle projection lens ranges from 13 mm to 28 mm.

Another embodiment of the invention provides a vehicle projection lens including a first lens, a second lens, a third lens and a fourth lens arranged in order along a direction. The first lens is an aspheric lens with a refractive power, the second lens is a concave lens with a negative refractive power, the third lens has a refractive power, the fourth lens has a positive refractive power, and the fourth lens is closest to a minified side among the first, the second, the third and the fourth lenses of the vehicle projection lens. The vehicle projection lens satisfies the following conditions: (1) an aperture stop is disposed between the third lens and the fourth lens; (2) an F-number of the vehicle projection lens is less than or equal to 0.86; (3) an effective focal length of the vehicle projection lens ranges from 13 mm to 28 mm; and (4) a length measured along an optical axis between two outermost lens surfaces with refractive powers at opposite ends of the vehicle projection lens ranges from 40 to 67 mm.

Through the design of various embodiments of the invention, a vehicle projection lens can be achieved that offers wide viewing angles, larger effective apertures, lower manufacturing costs, and higher image quality, while complying with government regulations regarding light pattern requirements.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc., as used herein, are used as labels for nouns that they precede, and do not imply any type of ordering (e.g., spatial, temporal, logical, etc.).

The term "lens" refers to an element made from a partially or entirely light-transmissive material with optical power. The material commonly includes plastic or glass.

In an optical projection system, a magnified side may refer to one side of an optical path of an optical lens comparatively near a projected image (such as a projection screen), and a minified side may refer to other side of the optical path comparatively near a light source or a light valve.

A certain region of a magnified-side surface (or a minified-side surface) of a lens may be convex or concave. Herein, a convex or concave region is more outwardly convex or inwardly concave in the direction of an optical axis as compared with other neighboring regions of the magnified/minified side surface.

Figure 1:
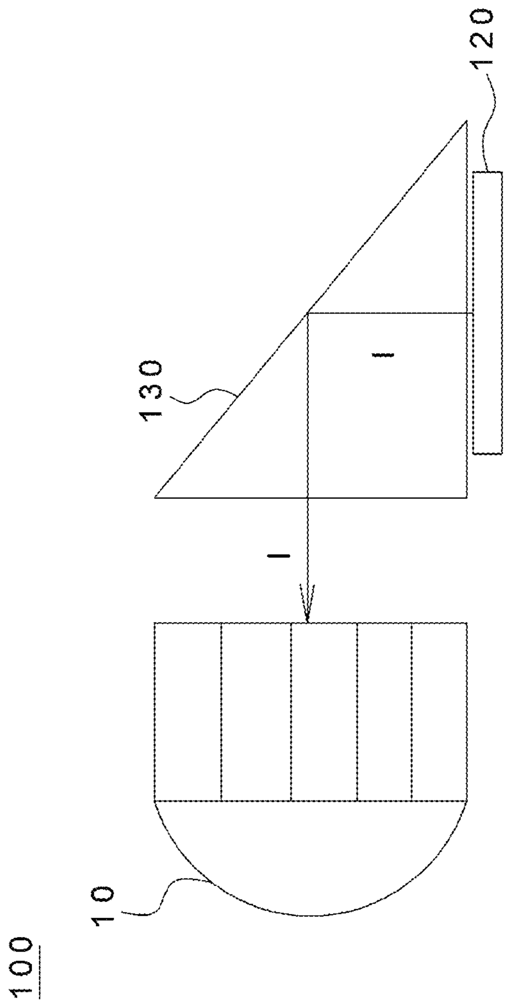
FIG. 1 is a schematic diagram of a vehicle lamp device according to an embodiment of the invention.

FIG. 1 is a schematic diagram of a vehicle lamp device according to an embodiment of the invention. As shown in FIG. 1, the vehicle lamp device 100 includes an image source 120, a vehicle projection lens 10, and a lamp cover (not shown). The image source 120 may be a micro-LED array, a laser, or LEDs. In this embodiment, a prism 130 (or a reflective mirror) can be placed on a minified side of the vehicle projection lens 10 to deflect the image beam I, thus achieving a folded optical path that reduces the overall space occupied by the vehicle lamp device 100.

Figure 2:
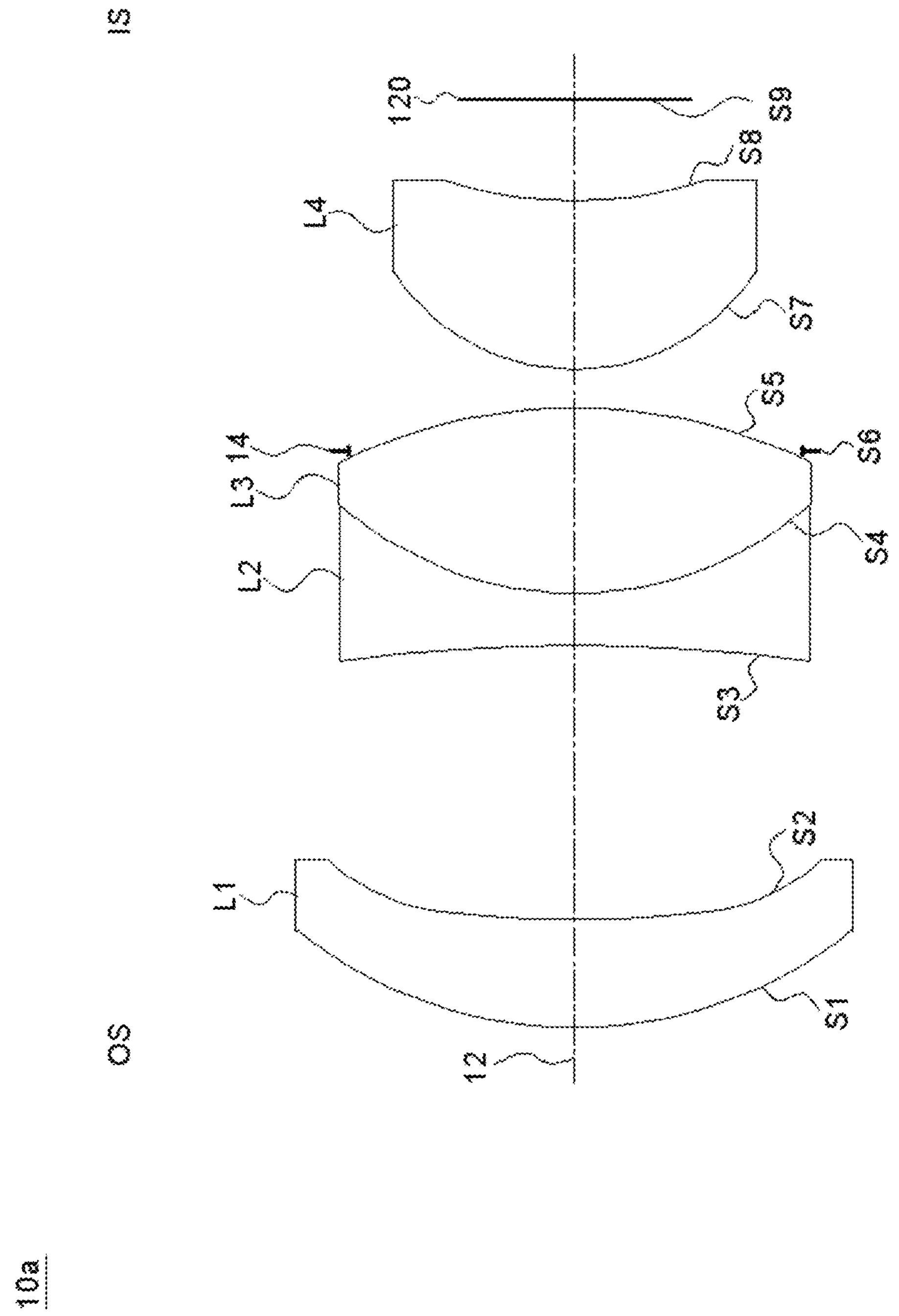
FIG. 2 shows a schematic diagram of a vehicle projection lens according to a first embodiment of the invention.

FIG. 2 shows a schematic diagram of a vehicle projection lens according to a first embodiment of the invention. As shown in FIG. 2, a vehicle projection lens 10*a* is disposed between a magnified side OS and a minified side IS of the vehicle projection lens 10*a*. The vehicle projection lens 10*a* has a lens barrel (not shown) and inside the lens barrel a lens L1, a lens L2, a lens L3, an aperture stop 14 and a lens LA are arranged in order from the magnified side OS to the minified side IS. Additionally, an image source 120 is positioned near the minified side IS. In this embodiment, the vehicle projection lens 10*a* consists essentially of four lenses with refractive powers, and the refractive powers of the lens L1, the lens L2, the lens L3 and the lens LA are positive, negative, positive and positive respectively. In this embodiment, the lens L1 is a plastic aspheric lens made of plastic materials such as PMMA or PC, the lens L2, the lens L3 and the lens L4 are glass spherical lenses, and the lens L2 and the lens L3 together form a cemented doublet to reduce chromatic aberration of the vehicle projection lens 10*a*.

According to various embodiments of the invention, the number, shape and optical characteristic of lenses can be designed according to actual needs without limitation. In each of the following embodiments, the magnified side OS is located on the left side and the image minified side IS is located on the right side of each figure, and thus this is not repeatedly described in the following for brevity.

The aperture stop 14 may be an independent light-blocking element or defined by an inner diameter of a lens barrel. In one embodiment, the aperture stop 14 may have a mechanic piece to block out peripheral light and transmit central light to achieve aperture effects. The mechanical piece may be adjusted by varying its position, shape or transmittance. In other embodiment, the aperture stop 14 may be formed by applying an opaque or a light-absorbing material on a lens surface except for a central area to block out peripheral light and transmit central light. When the aperture stop 14 increases in size, the F-number decreases. In various embodiments of the invention, the F-number of a vehicle projection lens is smaller than or equal to 0.86. In this embodiment, the F-number of the vehicle projection lens 10*a* is 0.64.

In at least some embodiments, an effective focal length (EFL) of the vehicle projection lens ranges from 13 to 28 mm, a back focal length (BFL) ranges from 4 to 10 mm, and a ratio of EFL/BFL ranges from 1 to 8, where the back focal length is measured along the optical axis 12 from the optical surface closest to the minified side IS (e.g., surface S8 of lens L4 in FIG. 1) to the image source 120. Additionally, an overall lens length (OAL), which is the length measured along the optical axis 12 between the two outermost lens surfaces with refractive powers at opposite ends of the vehicle projection lens (e.g., surface S1 and surface S8 in FIG. 1), ranges from 40 to 67 mm, and a total track length (TTL) of the vehicle projection lens is less than or equal to 80 mm. In this embodiment of the vehicle projection lens 10*a*, EFL=23.17 mm, BFL=7.1 mm, EFL/BFL=3.27, OAL=58.88 mm, and TTL=65.98 mm.

The full field of view (FOV) refers to a light collection angle of the optical surface S1 closest to the magnified side OS, measured by the horizontal diagonal. In at least some embodiments, the FOV ranges from 30 to 70 degrees, and a ratio R of the horizontal field of view to the vertical field of view ranges from 2.5:1 to 6:1. In this embodiment, the FOV of the vehicle projection lens 10*a* is 51.8 degrees, and the ratio R is 3.67:1.

Detailed optical data and design parameters of the vehicle projection lens 10*a* are shown in Table 1 below. Note the data provided below are not used for limiting the invention, and those skilled in the art may suitably modify parameters or settings of the following embodiment with reference of the invention without departing from the scope or spirit of the invention.

Table 1 lists the values of parameters for each lens of an optical system, where the surface symbol denoted by an asterisk is an aspherical surface, and a surface symbol without the denotation of an asterisk is a spherical surface.

TABLE 1

| Object description | Surface | Radius of curvature (mm) | Interval (mm) | Refractive index (Nd) | Abbe number (Vd) |
|---|---|---|---|---|---|
| L1 (aspheric) | S1* | 25.83 | 7.64 | 1.4927 | 54.66 |
| | S2* | 47.55 | 19.48 | | |
| L2 (bi-concave) | S3 | −143.01 | 3.74 | 1.8467 | 23.79 |
| L3 (bi-convex) | S4 | 25.41 | 13.20 | 1.8348 | 42.73 |
| | S5 | −37.81 | −3.00 | | |
| aperture stop 14 | S6 | INF | 5.93 | | |
| L4 (meniscus) | S7 | 16.18 | 11.90 | 1.804 | 46.57 |
| | S8 | 32.29 | 7.10 | | |
| Image source 120 | S9 | INF | 0.00 | | |

In Table 1 above, the heading "Interval" represents the distance between two adjacent surfaces along the optical axis 12 in the vehicle projection lens 10*a*. For example, the interval for surface S1 is the distance between surface S1 and surface S2 along the optical axis 12; similarly, the interval for surface S2 is the distance between surface S2 and surface S3 along the optical axis 12. Furthermore, the interval, refractive index, and Abbe number of any lens listed in the "Object Description" column are provided in the same horizontal row aligned with that lens, so related descriptions are omitted for brevity.

The radius values in the above table are the reciprocals of the curvatures. When a lens surface has a positive radius of curvature, the center of curvature of that surface is located towards the image side. Conversely, when a lens surface has a negative radius of curvature, the center of curvature is located towards the object side. The concavity or convexity of each lens surface is listed in the above table.

An aspheric lens indicates at least one of its front lens surface and rear lens surface has a radius of curvature that varies along a center axis to correct abbreviations. In the following design examples of the invention, each aspheric surface satisfies the following equation.

$$Z = \frac{cr^2}{1+\sqrt{1-(l+k)c^2r^2}} + Ar^4 + Br^6 + Cr^8 + Dr^{10} + Er^{12} + Fr^{14} + Gr^{16} + \ldots ,$$

where Z denotes a sag of an aspheric surface along the optical axis 12, c denotes a reciprocal of a radius of an osculating sphere, K denotes a conic constant, r denotes a height of the aspheric surface measured in a direction perpendicular to the optical axis 12, and parameters A-G are 4th, 6th, 8th, 10th, 12th, 14th and 16th order aspheric coefficients. Note the data provided below are not used for limiting the invention, and those skilled in the art may suitably modify parameters or settings of the following embodiment with reference of the invention without departing from the scope or spirit of the invention.

TABLE 2

| Surface | K | A | B | C | D |
|---|---|---|---|---|---|
| S1* | −55.63 | 3.827279E−05 | 5.360764E−07 | −7.281845E−09 | 4.025855E−11 |
| S2* | 5.77 | −2.272101E−04 | 4.631793E−06 | −4.774679E−08 | 2.809332E−10 |

| Surface | E | F | G |
|---|---|---|---|
| S1* | −1.118434E−13 | 1.519573E−16 | −8.012196E−20 |
| S2* | −9.381821E−13 | 1.658432E−15 | −1.216397E−18 |

Figure 3B:
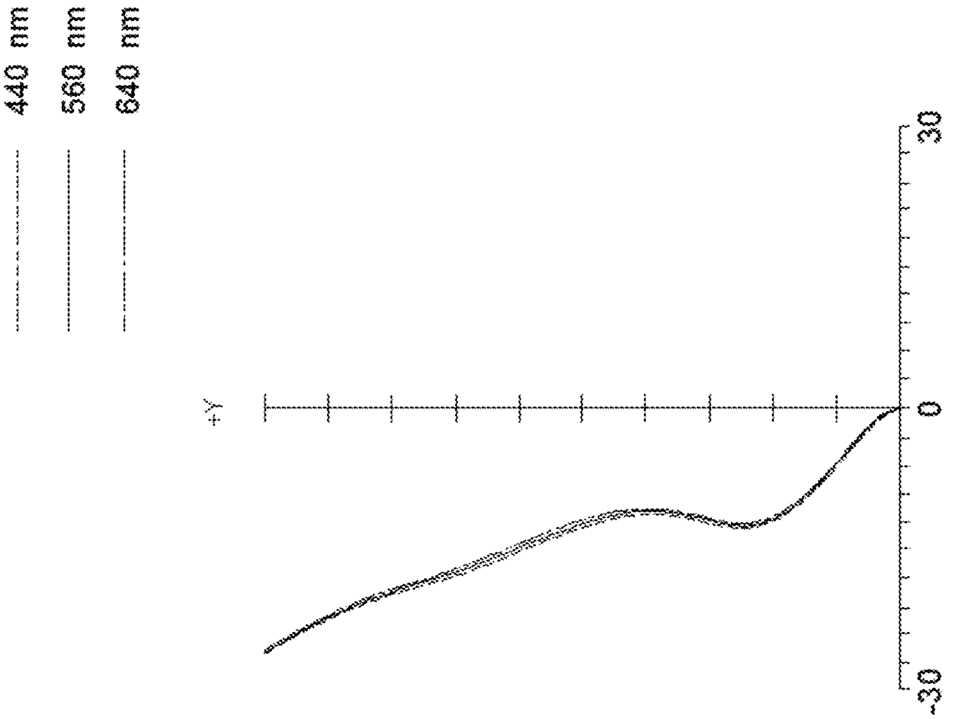
FIG. 3A, FIG. 3B and FIG. 4 respectively show field curvature, distortion and MTF curves of the vehicle projection lens illustrated in FIG. 2.
Figure 3A:
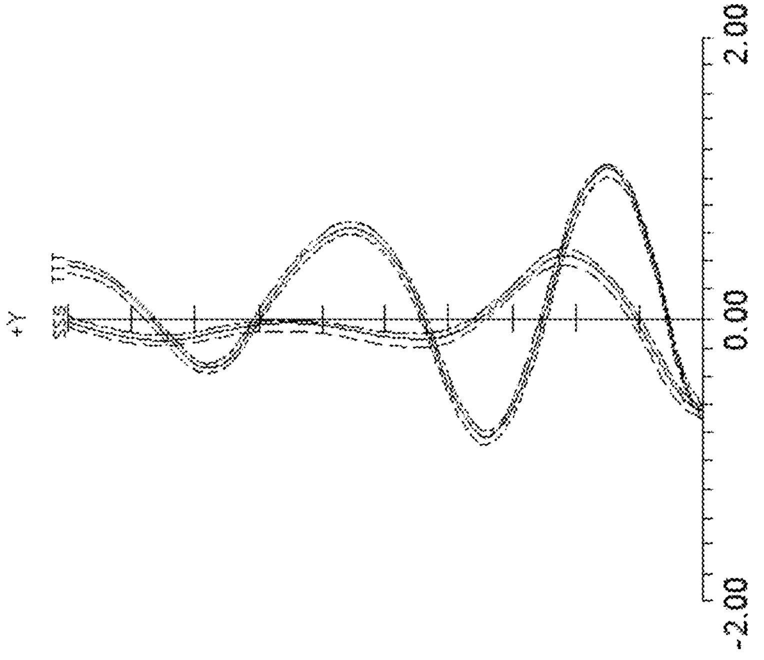
Figure 4:
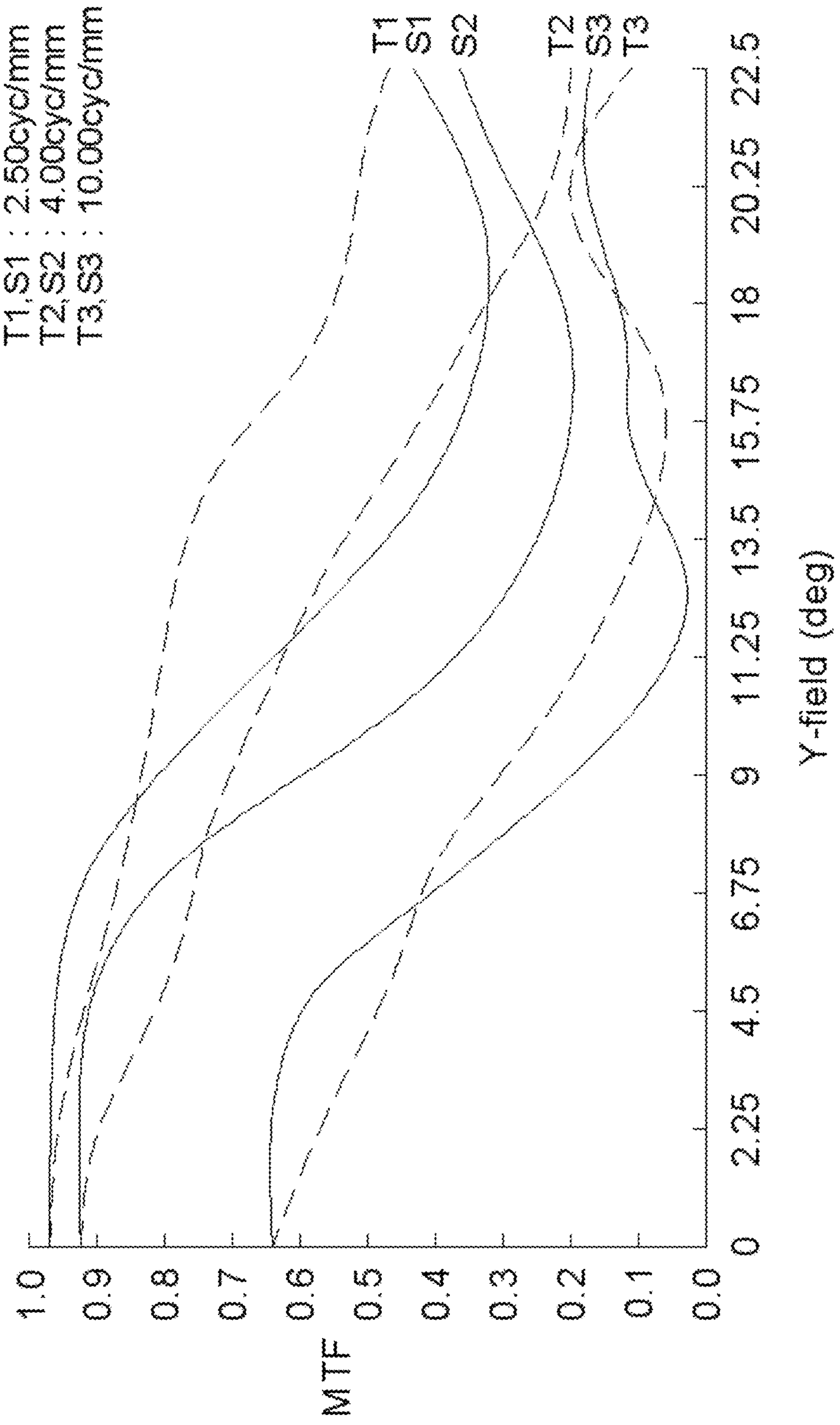

FIG. 3A, FIG. 3B, and FIG. 4 present the optical simulation data illustrating the imaging performance of the vehicle projection lens 10*a* as depicted in FIG. 2. FIG. 3A and FIG. 3B respectively show field curvature and distortion aberration curves of the vehicle projection lens 10*a*. FIG. 4 shows a modulation transfer function (MTF) curve, where the horizontal axis represents different positions along the Y-field from the optical axis toward the edge, and the vertical axis indicates the modulus of the optical transfer function (OTF). Since the curves shown in FIG. 3A, FIG. 3B, and FIG. 4 are all within the standard range, it can be verified that the vehicle projection lens 10*a* may achieve good imaging performance.

Figure 5:
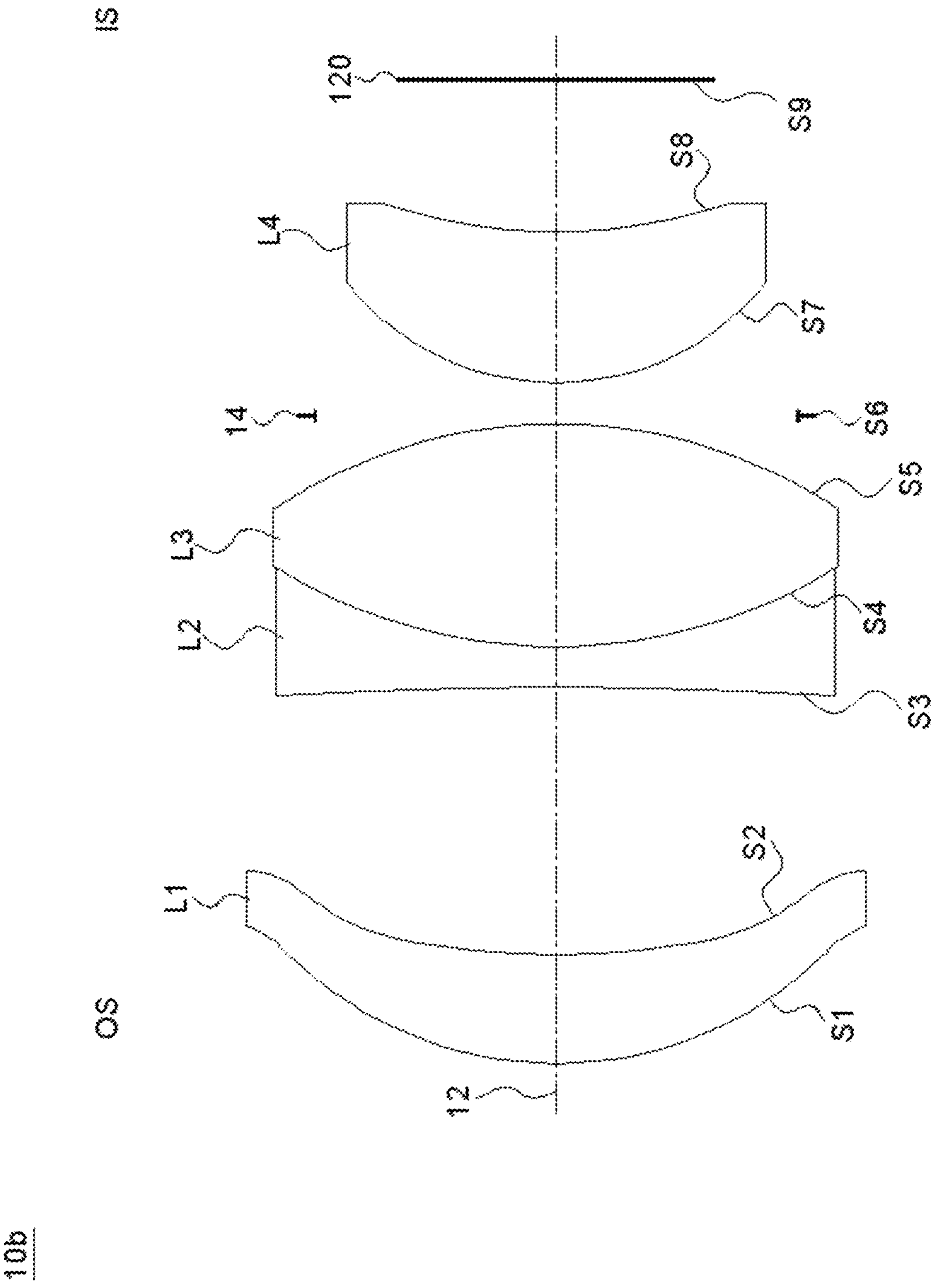
FIG. 5 shows a schematic diagram of a vehicle projection lens according to a second embodiment of the invention.

FIG. 5 shows a schematic diagram of a vehicle projection lens according to a second embodiment of the invention. As shown in FIG. 5, a vehicle projection lens 10*b* consists essentially of four lenses with refractive powers and includes a lens L1, a lens L2, a lens L3, an aperture stop 14 and a lens LA arranged in order from the magnified side OS to the minified side IS. The refractive powers of the lens L1, the lens L2, the lens L3 and the lens LA are positive, negative, positive and positive respectively. In this embodiment, the lens L1 is a plastic aspheric lens made of plastic materials such as PMMA or PC, the lens L2, the lens L3 and the lens LA are glass spherical lenses, and the lens L2 and the lens L3 together form a cemented doublet to reduce chromatic aberration of the vehicle projection lens 10*b*. In this embodiment, the vehicle projection lens 10*b* has a full field of view (FOV) of 49 degrees, an F-number of 0.645, an effective focal length EFL of 23.4 mm, a back focal length BFL of 8.76 mm, an EFL/BFL ratio of 2.67, an overall lens length OAL of 47.74 mm, a total track length TTL of 56.5 mm, and a horizontal-to-vertical field of view ratio of 3.83:1. Detailed optical data and design parameters of the vehicle projection lens 10*b* are shown in Table 3, and table 4 lists aspheric coefficients and conic constant of each aspheric surface of the optical lens 10*b*.

TABLE 3

| Object description | Surface | Radius of curvature (mm) | Interval (mm) | Refractive index (Nd) | Abbe number (Vd) |
|---|---|---|---|---|---|
| L1 (aspheric) | S1* | 20.28 | 6.25 | 1.4927 | 54.66 |
| | S2* | 42.93 | 15.40 | | |
| L2 (bi-concave) | S3 | −242.71 | 2.24 | 1.8467 | 23.79 |
| L3 (bi-convex) | S4 | 29.86 | 12.97 | 1.6030 | 65.46 |
| | S5 | −28.76 | 0.25 | | |
| aperture stop 14 | S6 | INF | 1.95 | | |
| L4 (meniscus) | S7 | 15.56 | 8.68 | 1.9037 | 31.32 |
| | S8 | 30.61 | 8.76 | | |
| Image source 120 | S9 | INF | 0.00 | | |

TABLE 4

| Surface | K | A | B | C | D |
|---|---|---|---|---|---|
| S1* | −36.22 | 2.55000E−04 | −3.24684E−06 | 3.01699E−08 | −1.73593E−10 |
| S2* | 0.35 | −5.82193E−05 | 1.34348E−06 | −1.38926E−08 | 9.35505E−11 |

| Surface | E | F | G |
|---|---|---|---|
| S1* | 6.06805E−13 | −1.16871E−15 | 9.27101E−19 |
| S2* | −3.44285E−13 | 6.06056E−16 | −3.99014E−19 |

Figure 6A:
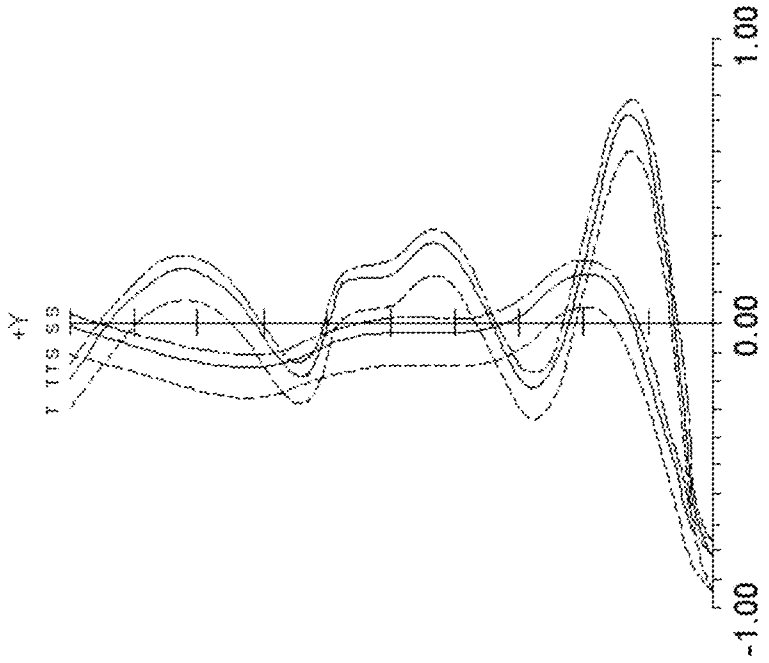
FIG. 6A, FIG. 6B and FIG. 7 respectively show field curvature, distortion and MTF curves of the vehicle projection lens illustrated in FIG. 5.
Figure 6B:
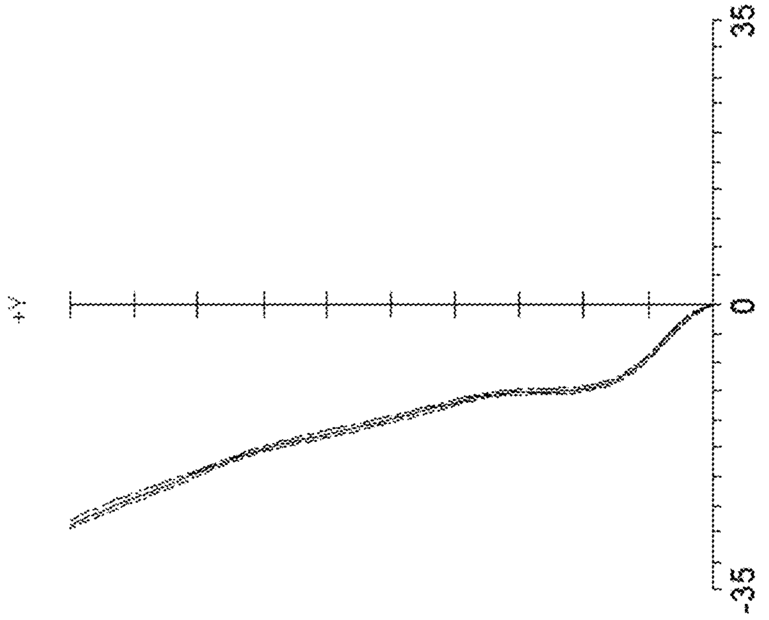
Figure 7:
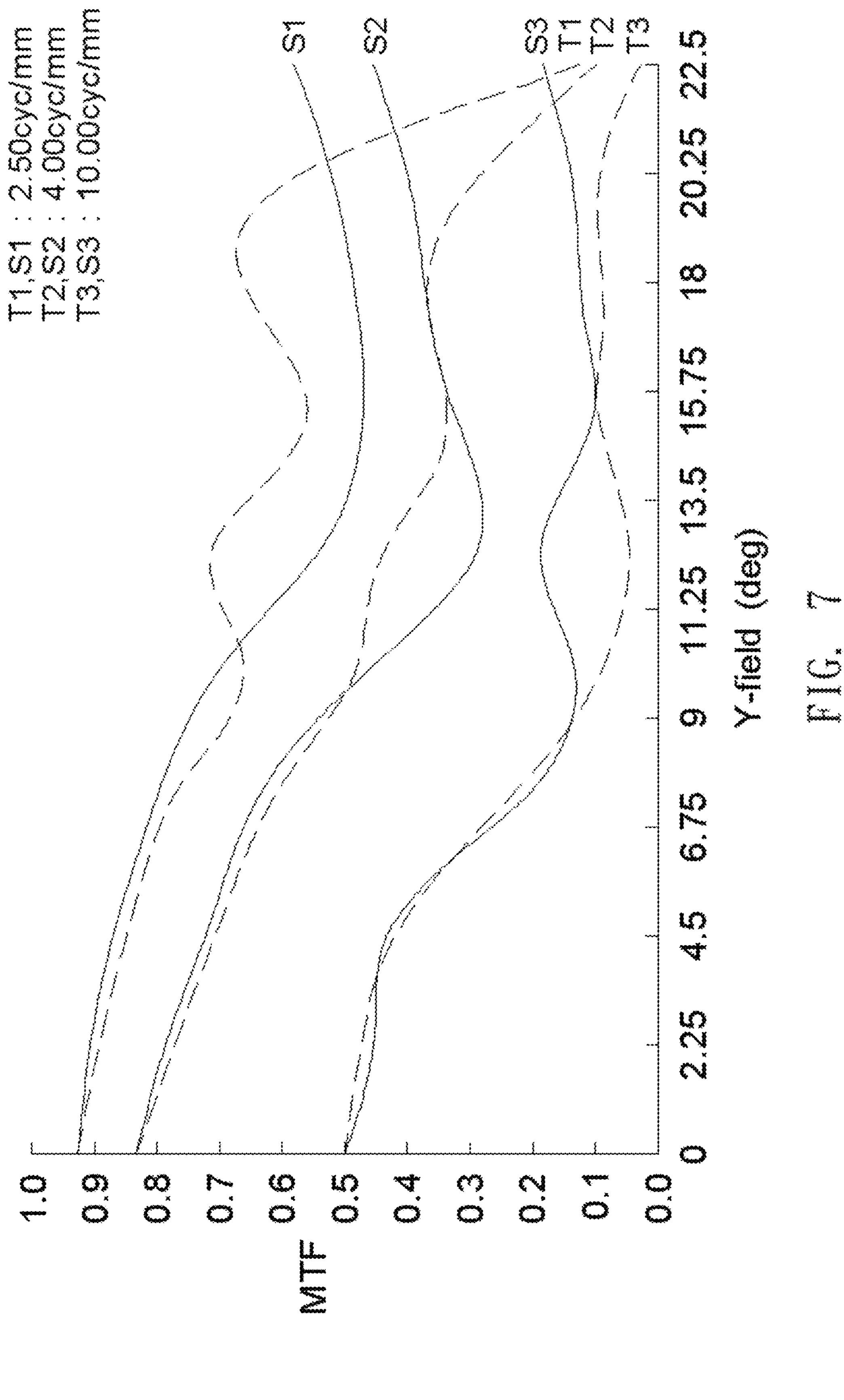

FIG. 6A, FIG. 6B, and FIG. 7 present the optical simulation data illustrating the imaging performance of the vehicle projection lens 10*b* as depicted in FIG. 5. FIG. 6A and FIG. 6B respectively show field curvature and distortion aberration curves of the vehicle projection lens 10*b*. FIG. 7 shows a modulation transfer function (MTF) curve, where the horizontal axis represents different positions along the Y-field from the optical axis toward the edge, and the vertical axis indicates the modulus of the optical transfer function (OTF). Since the curves shown in FIG. 6A, FIG. 6B, and FIG. 7 are all within the standard range, it can be verified that the vehicle projection lens 10*b* may achieve good imaging performance.

Figure 8:
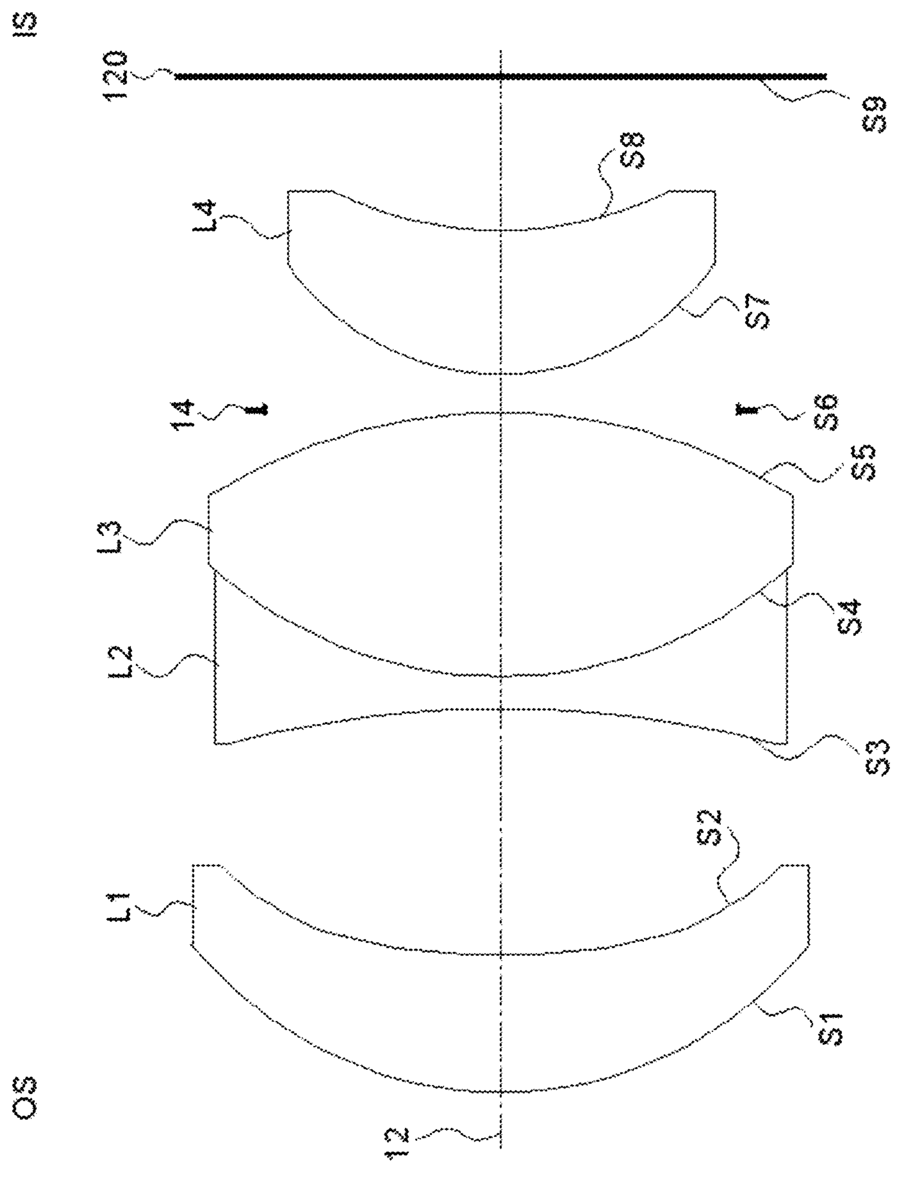
FIG. 8 shows a schematic diagram of a vehicle projection lens according to a third embodiment of the invention.
Figure 9:
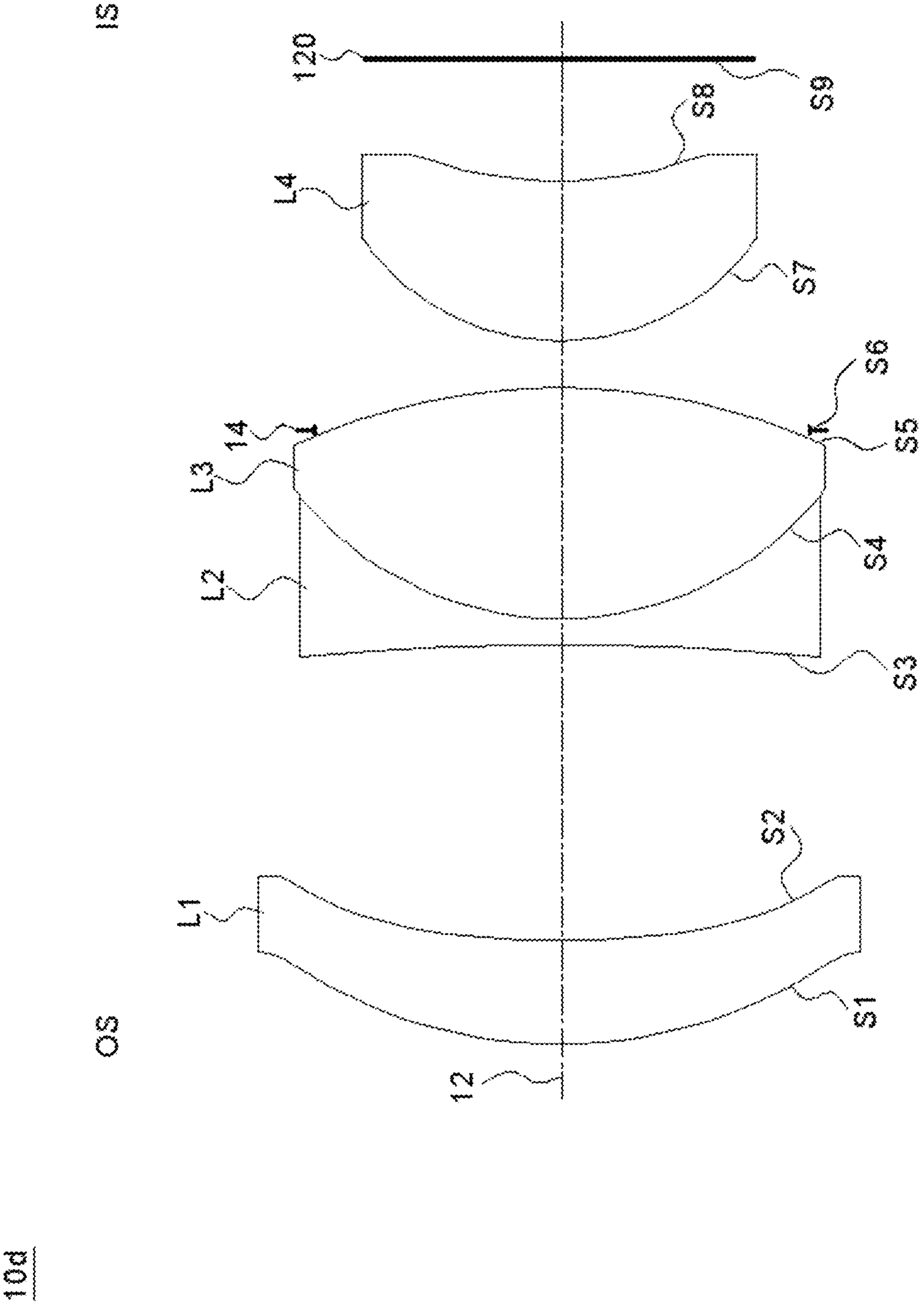
FIG. 9 shows a schematic diagram of a vehicle projection lens according to a fourth embodiment of the invention.

FIG. 8 shows a schematic diagram of a vehicle projection lens 10*c* according to a third embodiment of the invention, and FIG. 9 shows a schematic diagram of a vehicle projection lens 10*d* according to a fourth embodiment of the invention. In the third and fourth embodiments, the primary differences compared to the first embodiment include the radius of curvature, interval, refractive index, Abbe number, aspheric coefficients, and other parameters. In the third embodiment, the vehicle projection lens 10*c* has a full field of view (FOV) of 48.4 degrees, an F-number of 0.646, an effective focal length EFL of 23.4 mm, a back focal length BFL of 8.71 mm, an EFL/BFL ratio of 2.69, an overall lens length OAL of 49.29 mm, a total track length TTL of 58.0 mm, and a horizontal-to-vertical field of view ratio of 3.69:1. In the fourth embodiment, the vehicle projection lens 10*d* has a full field of view (FOV) of 50.2 degrees, an F-number of 0.639, an effective focal length EFL of 23.4 mm, a back focal length BFL of 7.77 mm, an EFL/BFL ratio of 3.01, an overall lens length OAL of 56.01 mm, a total track length TTL of 63.78 mm, and a horizontal-to-vertical field of view ratio of 3.64:1.

Detailed optical data and design parameters of the vehicle projection lens 10*c* are shown in Table 5, and Table 6 lists aspheric coefficients and conic constant of each aspheric surface of the optical lens 10*c*. Detailed optical data and design parameters of the vehicle projection lens 10*d* are shown in Table 7, and Table 8 lists aspheric coefficients and conic constant of each aspheric surface of the optical lens 10*d*.

TABLE 5

| Object description | Surface | Radius of curvature (mm) | Interval (mm) | Refractive index (Nd) | Abbe number (Vd) |
|---|---|---|---|---|---|
| L1 (aspheric) | S1* | 19.19 | 7.95 | 1.4927 | 54.66 |
| | S2* | 43.19 | 13.90 | | |
| L2 (bi-concave) | S3 | −63.51 | 2.00 | 1.8467 | 23.79 |
| L3 (bi-convex) | S4 | 24.90 | 14.99 | 1.8348 | 42.73 |
| | S5 | −32.21 | 0.25 | | |
| aperture stop 14 | S6 | INF | 1.94 | | |
| L4 (meniscus) | S7 | 14.93 | 8.26 | 1.9037 | 31.32 |
| | S8 | 23.51 | 8.71 | | |
| Image source 120 | S9 | INF | 0.00 | | |

TABLE 6

| Surface | K | A | B | C | D |
|---|---|---|---|---|---|
| S1* | −43.63 | 2.702441E−04 | −3.322056E−06 | 3.027366E−08 | −1.745997E−10 |
| S2* | 5.31 | −4.742669E−05 | 1.266452E−06 | −1.429699E−08 | 9.538569E−11 |

| Surface | E | F | G |
|---|---|---|---|
| S1* | 6.087730E−13 | −1.151983E−15 | 8.911363E−19 |
| S2* | −3.402499E−13 | 5.976907E−16 | −4.414720E−19 |

TABLE 7

| Object description | Surface | Radius of curvature (mm) | Interval (mm) | Refractive index (Nd) | Abbe number (Vd) |
|---|---|---|---|---|---|
| L1 (aspheric) | S1* | 26.13 | 6.76 | 1.4927 | 54.66 |
| | S2* | 60.99 | 18.85 | | |
| L2 (bi-concave) | S3 | −187.80 | 2.00 | 1.8467 | 23.79 |
| L3 (bi-convex) | S4 | 21.83 | 15.02 | 1.8348 | 42.73 |
| | S5 | −38.81 | −2.94 | | |
| aperture stop 14 | S6 | INF | 5.85 | | |
| L4 (meniscus) | S7 | 15.82 | 10.48 | 1.804 | 46.57 |
| | S8 | 30.16 | 7.77 | | |
| Image source 120 | S9 | INF | 0.00 | | |

TABLE 8

| Surface | K | A | B | C | D |
|---|---|---|---|---|---|
| S1* | −87.77 | 1.589084E−04 | −1.661822E−06 | 1.233422E−08 | −5.702138E−11 |
| S2* | 9.00 | −6.566065E−05 | 1.230865E−06 | −1.110684E−08 | 6.018611E−11 |

| Surface | E | F | G |
|---|---|---|---|
| S1* | 1.588566E−13 | −2.443788E−16 | 1.568549E−19 |
| S2* | −1.873390E−13 | 3.049915E−16 | −2.057915E−19 |

According to the above embodiments, because the lens L1 is an aspheric plastic lens and the lenses L2, L3, and LA are spherical glass lenses, this configuration may offer lower manufacturing costs while maintaining good imaging quality. Furthermore, by utilizing only four lenses in the vehicle projection lens, the number of lenses is reduced, which further lowers manufacturing costs and minimizes the overall size. Through the designs of various embodiments of the invention, a vehicle projection lens can be achieved that offers wide viewing angles, larger effective apertures, lower manufacturing costs, and higher image quality, while complying with government regulations regarding light pattern requirements.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A vehicle projection lens, comprising:

an aspheric first lens with a positive refractive power, a cemented lens, and a spherical fourth lens with a positive refractive power arranged in order from a magnified side to a minified side of the vehicle projection lens, the cemented lens comprising a spherical second lens and a spherical third lens, the first lens, the second lens, the third lens and the fourth lens being arranged in order along a direction, the second lens being a concave lens and having a negative refractive power, and the third lens having a positive refractive power, wherein the vehicle projection lens satisfies the following conditions:

(1) an aperture stop is disposed between the third lens and the fourth lens;

(2) an F-number of the vehicle projection lens is less than or equal to 0.86;

(3) a full field of view of the vehicle projection lens ranges from 30 to 70 degrees; and (4) an effective focal length of the vehicle projection lens ranges from 13 mm to 28 mm.

2. The vehicle projection lens as claimed in claim 1, wherein a length measured along an optical axis between two outermost lens surfaces with refractive powers at opposite ends of the vehicle projection lens ranges from 40 to 67 mm.

3. The vehicle projection lens as claimed in claim 1, wherein the vehicle projection lens comprises at least one plastic lens.

4. The vehicle projection lens as claimed in claim 1, wherein the first lens is a plastic lens, and the second lens, the third lens and the fourth lens are glass lenses.

5. The vehicle projection lens as claimed in claim 1, wherein a total track length of the vehicle projection lens is less than or equal to 80 mm.

6. The vehicle projection lens as claimed in claim 1, wherein a ratio of a horizontal field of view to a vertical field of view of the vehicle projection lens ranges from 2.5:1 to 6:1.

7. The vehicle projection lens as claimed in claim 1, wherein the second lens, the third lens and the fourth lens are respectively a biconcave lens, a biconvex lens and a meniscus lens.

8. The vehicle projection lens as claimed in claim 1, wherein a back focal length of the vehicle projection lens ranges from 4 to 10 mm.

9. The vehicle projection lens as claimed in claim 1, wherein a ratio of the effective focal length to a back focal length of the vehicle projection lens ranges from 1 to 8.

10. A vehicle projection lens, comprising:

a first lens, a second lens, a third lens and a fourth lens arranged in order along a direction, the first lens being an aspheric lens with a refractive power, the second lens being a concave lens with a negative refractive power, the third lens having a refractive power, the fourth lens having a positive refractive power, and the fourth lens being closest to a minified side among the first, the second, the third and the fourth lenses of the vehicle projection lens, wherein the vehicle projection lens satisfies the following conditions:

(1) an aperture stop is disposed between the third lens and the fourth lens;

(2) an F-number of the vehicle projection lens is less than or equal to 0.86;

(3) an effective focal length of the vehicle projection lens ranges from 13 mm to 28 mm;

(4) a length measured along an optical axis between two outermost lens surfaces with refractive powers at opposite ends of the vehicle projection lens ranges from 40 to 67 mm; and (5) a full field of view of the vehicle projection lens ranges from 30 to 70 degrees.

11. The vehicle projection lens as claimed in claim 10, wherein the first lens has a positive refractive power and the third lens has a positive refractive power.

12. The vehicle projection lens as claimed in claim 10, wherein the second lens and the third lens form a cemented doublet.

13. The vehicle projection lens as claimed in claim 10, wherein the vehicle projection lens comprises at least one plastic lens.

14. The vehicle projection lens as claimed in claim 10, wherein the first lens is a plastic lens, and the second lens, the third lens and the fourth lens are glass lenses.

15. The vehicle projection lens as claimed in claim 10, wherein a total track length of the vehicle projection lens is less than or equal to 80 mm.

16. The vehicle projection lens as claimed in claim 10, wherein a ratio of a horizontal field of view to a vertical field of view of the vehicle projection lens ranges from 2.5:1 to 6:1.

17. The vehicle projection lens as claimed in claim 10, wherein the second lens, the third lens and the fourth lens are respectively a biconcave lens, a biconvex lens, and a meniscus lens.

18. The vehicle projection lens as claimed in claim 10, wherein a back focal length of the vehicle projection lens ranges from 4 to 10 mm.

19. The vehicle projection lens as claimed in claim 10, wherein a ratio of the effective focal length to a back focal length of the vehicle projection lens ranges from 1 to 8.

* * * * *